United States Patent
Horn et al.

(10) Patent No.: US 10,104,540 B2
(45) Date of Patent: Oct. 16, 2018

(54) DETERMINING TO USE MULTI-RAN INTERWORKING BY CORRELATING DIFFERENT RAN IDENTIFIERS

(71) Applicant: QUALCOMM Incorporated, San Diego, CA (US)

(72) Inventors: Gavin Bernard Horn, La Jolla, CA (US); Gerardo Giaretta, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 14/158,915

(22) Filed: Jan. 20, 2014

(65) Prior Publication Data

US 2014/0204927 A1 Jul. 24, 2014

Related U.S. Application Data

(60) Provisional application No. 61/755,505, filed on Jan. 23, 2013.

(51) Int. Cl.
*H04W 8/26* (2009.01)
*H04W 8/06* (2009.01)
(Continued)

(52) U.S. Cl.
CPC ............ *H04W 8/26* (2013.01); *H04W 8/06* (2013.01); *H04W 76/15* (2018.02); *H04W 76/16* (2018.02);
(Continued)

(58) Field of Classification Search
CPC ....... H04W 8/26; H04W 76/026; H04W 8/06; H04W 48/18; H04W 12/06; H04W 76/16; H04W 76/15; H04L 63/0876
See application file for complete search history.

(56) References Cited

U.S. PATENT DOCUMENTS 8,311,543 B2 11/2012 Dravida et al.
8,699,475 B2 * 4/2014 Nakajima .................... 370/338
(Continued)

FOREIGN PATENT DOCUMENTS

CN 101232454 A 7/2008
CN 102215530 A 10/2011
(Continued)

OTHER PUBLICATIONS

3GPP TSG-RAN WG2 Meeting #81, "Renesas Mobile Europe", Discussion on WLAN/3GPP Radio Interworking Scenario, R2-138447, Jan. 18, 2013 (Jan. 18, 2013), pp. 1-3, XP055118719, Retrieved from the Internet: URL:http://www.3gpp.org/ftpjtsg ranjWG2 RL 2/TSGR2 81/Docs/R2-130447.zip—[retrieved on May 19, 2014] paragraph [02.2]; figure 1.

(Continued)

*Primary Examiner* — Gbemileke J Onamuti
(74) *Attorney, Agent, or Firm* — Anthony R. Morris

(57) ABSTRACT

Certain aspects of the present disclosure provide a method for confirming identity of a user equipment (UE) registered in both a wireless local area network (WLAN) and WWAN. A method is provided for wireless communications by a base station (BS). The method generally includes establishing communications with a first UE, wherein the UE is identified by a first set of one or more identifiers in a wide area wireless network (WWAN) and by a second set of one or more identifiers in a wide local area network (WLAN), and determining, based on the first and second set of identifiers, a UE connected to the WWAN and WLAN is the first UE.

53 Claims, 12 Drawing Sheets

(51) Int. Cl.
*H04W 76/16* (2018.01)
*H04W 76/15* (2018.01)
*H04W 48/18* (2009.01)
*H04L 29/06* (2006.01)
*H04W 12/06* (2009.01)

(52) U.S. Cl.
CPC ......... *H04L 63/0876* (2013.01); *H04W 12/06* (2013.01); *H04W 48/18* (2013.01)

(56) References Cited

U.S. PATENT DOCUMENTS

| | | | |
|---|---|---|---|
| 2007/0211675 A1* | 9/2007 | Jain et al. | 370/338 |
| 2013/0267229 A1* | 10/2013 | Gopalakrishnan | 455/436 |
| 2014/0051393 A1* | 2/2014 | Mildh et al. | 455/411 |
| 2014/0112320 A1* | 4/2014 | Makhlouf | H04W 72/02 370/338 |

FOREIGN PATENT DOCUMENTS

| | | | |
|---|---|---|---|
| EP | 2704481 A1 | 3/2014 | |
| JP | 2008061266 A | 3/2008 | |
| JP | 2009541843 A | 11/2009 | |
| WO | WO-2007008573 A2 | 1/2007 | |
| WO | WO-2011109189 A2 | 9/2011 | |
| WO | WO-2012163260 A1 | 12/2012 | |

OTHER PUBLICATIONS

3rd Generation Partnership Project (3GPP), CATT: "Scenarios of WLAN/3GPP Radio Interworking", 3GPP Draft; R2-130106 Scenarios of WLAN 3GPP Interworking, , Mobile Competence Centre ; 650, Route Des Lucioles ; F-06921 Sophia-Antipolis Cedex ; France vol. RAN WG2, No. St. Julian; 20130128-20130281 Jan. 18, 2813 (Jan. 18, 2013), XP050668006, Retrieved from the Internet: URL:http://www.3gpp.org/ftpjtsg ran/WG2 RL 2/TSGR2 81/Docs/—[retrieved on Jan. 18, 2013] paragraph [02.1].
International Search Report and Written Opinion—PCT/US2014/012278—ISA/EPO—May 27, 2014.
Taiwan Search Report—TW103102138—TIPO—Apr. 10, 2015.

* cited by examiner

DETERMINING TO USE MULTI-RAN INTERWORKING BY CORRELATING DIFFERENT RAN IDENTIFIERS

CLAIM OF PRIORITY UNDER 35 U.S.C. § 119

This application claims the benefit of U.S. Provisional Patent application Ser. No. 61/755,505, filed Jan. 23, 2013, which is herein incorporated by reference in its entirety.

BACKGROUND

Field

Aspects of the present disclosure relate generally to wireless communications, and more particularly, to techniques for determining to use Long Term Evolution (LTE) and wireless local area network (WLAN) at the radio access network (RAN) at the user equipment (UE) and network by correlating LTE and WLAN identifiers.

Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include code division multiple access (CDMA) networks, time division multiple access (TDMA) networks, frequency division multiple access (FDMA) networks, orthogonal FDMA (OFDMA) networks, and single-carrier FDMA (SC-FDMA) networks.

A user equipment (UE) may be located within the coverage of multiple wireless networks, which may support different communication services. A suitable wireless network may be selected to serve the UE based on one or more criteria. The selected wireless network may be unable to provide a desired communication service (e.g., voice service) for the UE. A set of procedures may then be performed to redirect the UE to another wireless network (e.g., 2G, 3G or non-LTE 4G) that can provide the desired communication service.

SUMMARY

Certain aspects of the present disclosure provide a method for wireless communications by a base station. The method generally includes establishing communications with a first user equipment (UE), wherein the UE is identified by a first set of one or more identifiers in a wide area wireless network (WWAN) and by a second set of one or more identifiers in a wide local area network (WLAN) and determining, based on the first and second set of identifiers, a UE connected to the WWAN and WLAN is the first UE.

Certain aspects of the present disclosure provide a method for wireless communications by a user equipment. The method generally includes establishing communications with a wide area wireless network (WWAN) and a wide local area network (WLAN), wherein the UE is identified by a first set of one or more identifiers in the WWAN and by a second set of one or more identifiers in the WLAN and providing, when establishing communications with a first one of the WWAN or WLAN, a set of identifiers allowing the other of the WWAN or WLAN to identify the UE.

Certain aspects of the present disclosure provide an apparatus for secure wireless communications by a first base station. The apparatus generally includes means for establishing communications with a first UE, wherein the UE is identified by a first set of one or more identifiers in a wide area wireless network (WWAN) and by a second set of one or more identifiers in a wide local area network (WLAN) and means for determining, based on the first and second set of identifiers, a UE connected to the WWAN and WLAN is the first UE.

Certain aspects of the present disclosure provide an apparatus for secure wireless communications by a first base station. The apparatus generally includes at least one processor configured to establish communications with a first UE, wherein the UE is identified by a first set of one or more identifiers in a wide area wireless network (WWAN) and by a second set of one or more identifiers in a wide local area network (WLAN) and determine, based on the first and second set of identifiers, a UE connected to the WWAN and WLAN is the first UE. The apparatus also includes a memory coupled to the at least one processor.

Certain aspects of the present disclosure provide a computer program product for secure wireless communications by a first base station. The computer program product generally includes a computer readable medium having instructions stored thereon, the instructions executable by one or more processors for establishing communications with a first UE, wherein the UE is identified by a first set of one or more identifiers in a wide area wireless network (WWAN) and by a second set of one or more identifiers in a wide local area network (WLAN) and determining, based on the first and second set of identifiers, a UE connected to the WWAN and WLAN is the first UE.

Certain aspects of the present disclosure provide an apparatus for secure wireless communications by a UE. The apparatus generally includes means for establishing communications with a wide area wireless network (WWAN) and a wide local area network (WLAN), wherein the UE is identified by a first set of one or more identifiers in the WWAN and by a second set of one or more identifiers in the WLAN and means for providing, when establishing communications with a first one of the WWAN or WLAN, a set of identifiers allowing the other of the WWAN or WLAN to identify the UE.

Certain aspects of the present disclosure provide an apparatus for secure wireless communications by a UE. The apparatus generally includes at least one processor configured to establish communications with a wide area wireless network (WWAN) and a wide local area network (WLAN), wherein the UE is identified by a first set of one or more identifiers in the WWAN and by a second set of one or more identifiers in the WLAN and provide, when establishing communications with a first one of the WWAN or WLAN, a set of identifiers allowing the other of the WWAN or WLAN to identify the UE. The apparatus also includes a memory coupled to the at least one processor.

Certain aspects of the present disclosure provide a computer program product for secure wireless communications by a UE. The computer program generally includes a computer readable medium having instructions stored thereon, the instructions executable by one or more processors for establishing communications with a wide area wireless network (WWAN) and a wide local area network (WLAN), wherein the UE is identified by a first set of one or more identifiers in the WWAN and by a second set of one or more identifiers in the WLAN and providing, when establishing communications with a first one of the WWAN or WLAN, a set of identifiers allowing the other of the WWAN or WLAN to identify the UE.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example Ethernet media access control (MAC) frame, according to certain aspects of the present disclosure.

FIG. 8 illustrates an example Ethernet MAC frame including a header, according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1X radio transmission technology (1xRTT), CDMA2000 1X, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs.

Circuit-switched fallback (CSFB) is a technique to deliver voice-services to a mobile, when the mobile is camped in a long-term evolution (LTE) network. This may be required when the LTE network does not support voice services natively. The LTE network and a 3GPP CS network (e.g., UMTS or GSM) may be connected using a tunnel interface. The user equipment (UE) may register with the 3GPP CS network while on the LTE network by exchanging messages with the 3GPP CS core network over the tunnel interface.

Figure 1:
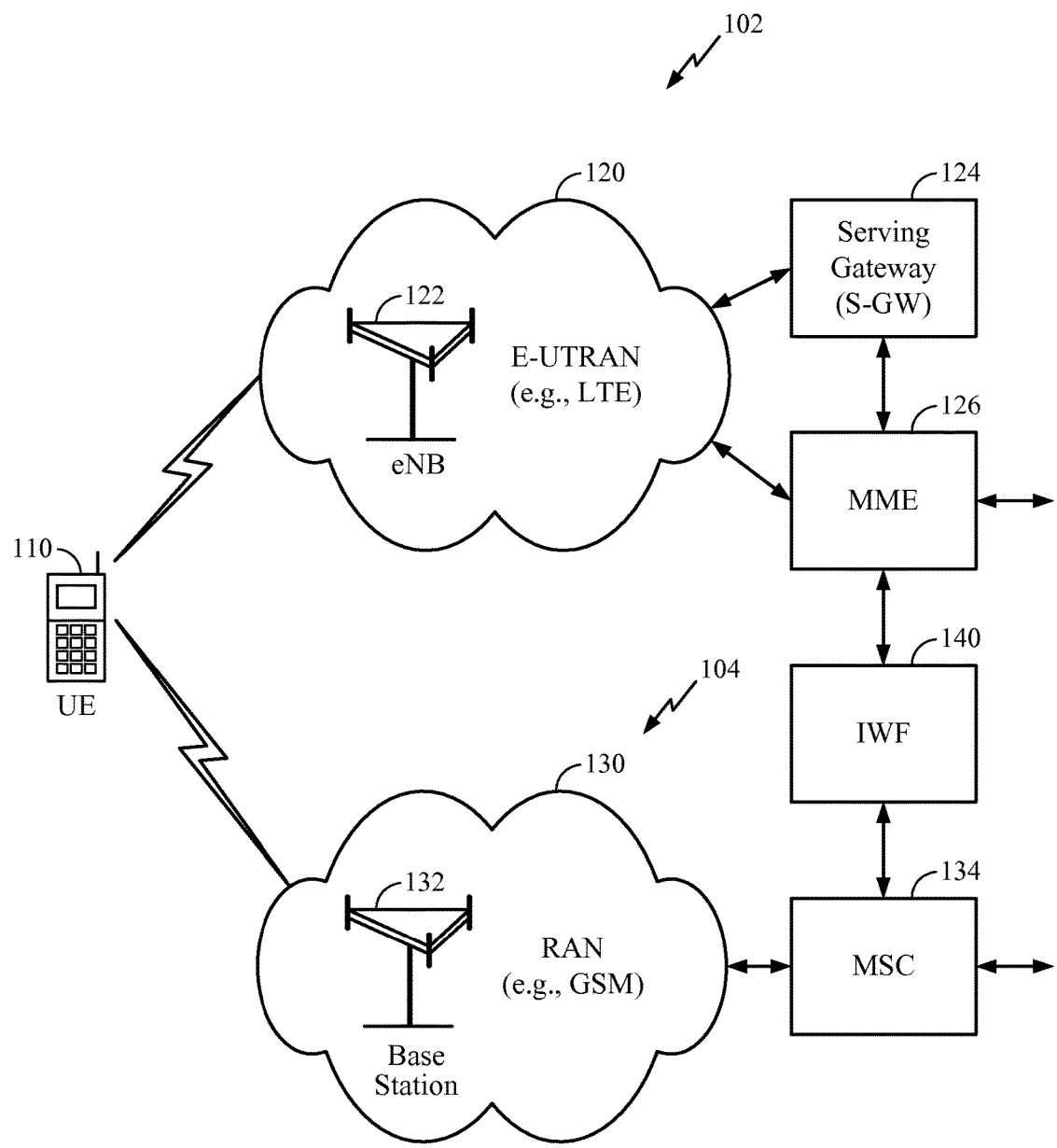
FIG. 1 illustrates an exemplary deployment in which multiple wireless networks have overlapping coverage.

FIG. 1 shows an exemplary deployment in which multiple wireless networks have overlapping coverage. An evolved universal terrestrial radio access network (E-UTRAN) 120 may support LTE and may include a number of evolved Node Bs (eNBs) 122 and other network entities that can support wireless communication for user equipments 110 (UEs). Each eNB 122 may provide communication coverage for a particular geographic area. The term "cell" can refer to a coverage area of an eNB 122 and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN) 120; Overall description," which is publicly available.

A radio access network (RAN) 130 may support GSM and may include a number of base stations 132 and other network entities that can support wireless communication for UEs 110. A mobile switching center (MSC) 134 may communicate with the RAN 130 and may support voice services, provide routing for circuit-switched calls, and perform mobility management for UEs 110 located within the area served by MSC 134. Optionally, an inter-working function (IWF) 140 may facilitate communication between MME 126 and MSC 134 (e.g., for 1xCSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); UE procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1xRTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
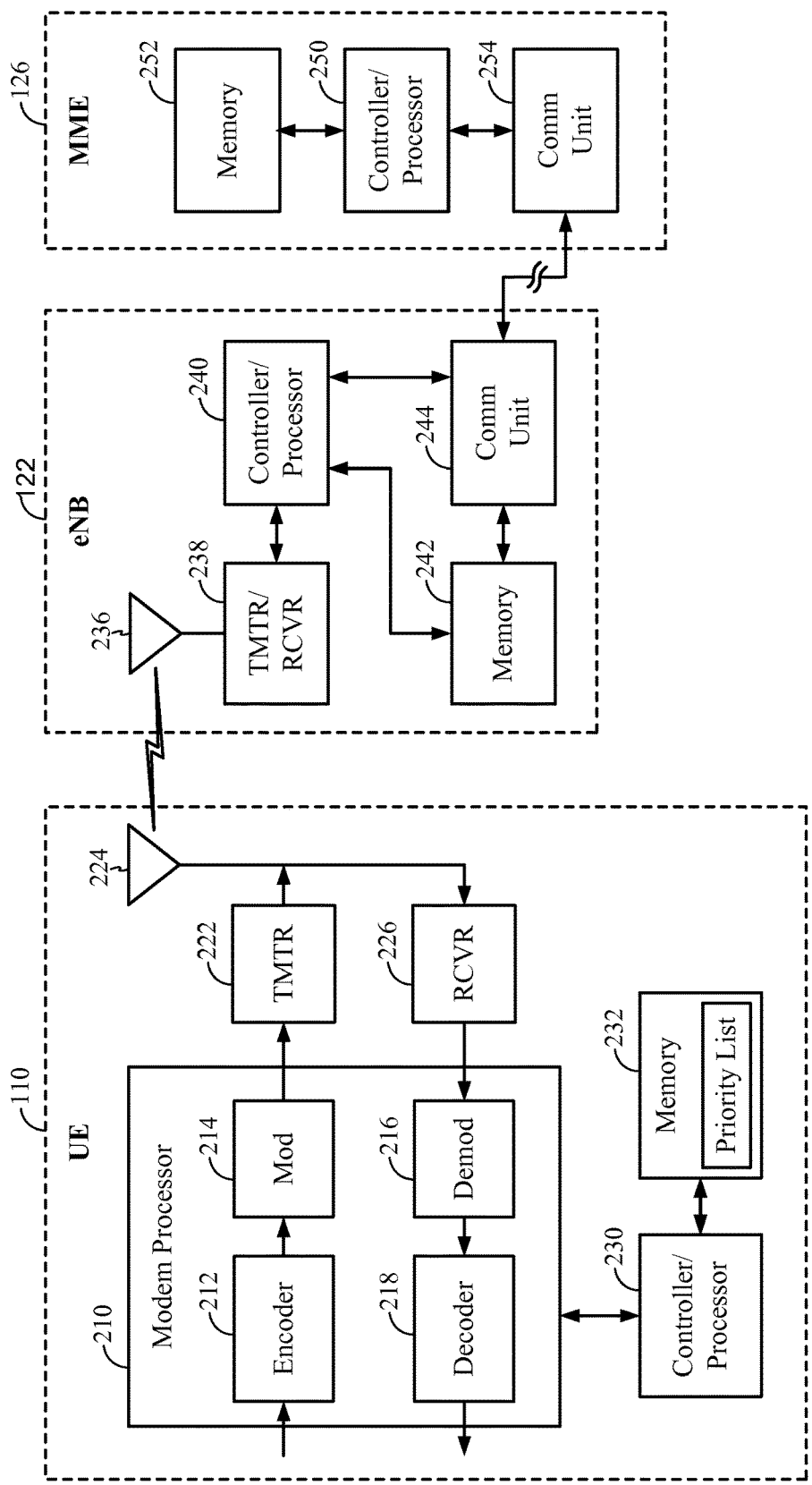
FIG. 2 illustrates a block diagram of a user equipment (UE) and other network entities.

FIG. 2 shows a block diagram of a design of UE 110, eNB 122, and MME 126 in FIG. 1. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs 122/base stations 132. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1xRTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIGS. 3 and 4. Memory 232 may store program codes and data for UE 110. Memory 232 may also store a priority list and configuration information.

At eNB 122, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122 in FIGS. 3 and 4. Memory 242 may store program codes and data for the base station 132. A communication (Comm) unit 244 may support communication with MME 126 and/or other network entities.

At MME 126, a controller/processor 250 may perform various functions to support communication services for UEs. Controller/processor 250 may also perform or direct the processing by MME 126 in FIGS. 3 and 4. Memory 252 may store program codes and data for MME 126. A communication unit 254 may support communication with other network entities.

FIG. 2 shows simplified designs of UE 110, eNB 122, and MME 126. In general, each entity may include any number of transmitters, receivers, processors, controllers, memories, communication units, etc. Other network entities may also be implemented in similar manner.

Example Techniques for Determining to Use Multi-Ran Interworking by Correlating Different Ran Identifiers Aspects of the present disclosure provide techniques that may allow confirmation that a user equipment (UE) registered in one radio access network (RAN) is the same UE (e.g., wireless local area network (WLAN)) is the same UE also registered in another RAN by correlating IDs of the different RANs. For example, the techniques may be used to confirm a device registered in a WLAN network is the same as device registered in an LTE network.

Figure 3:
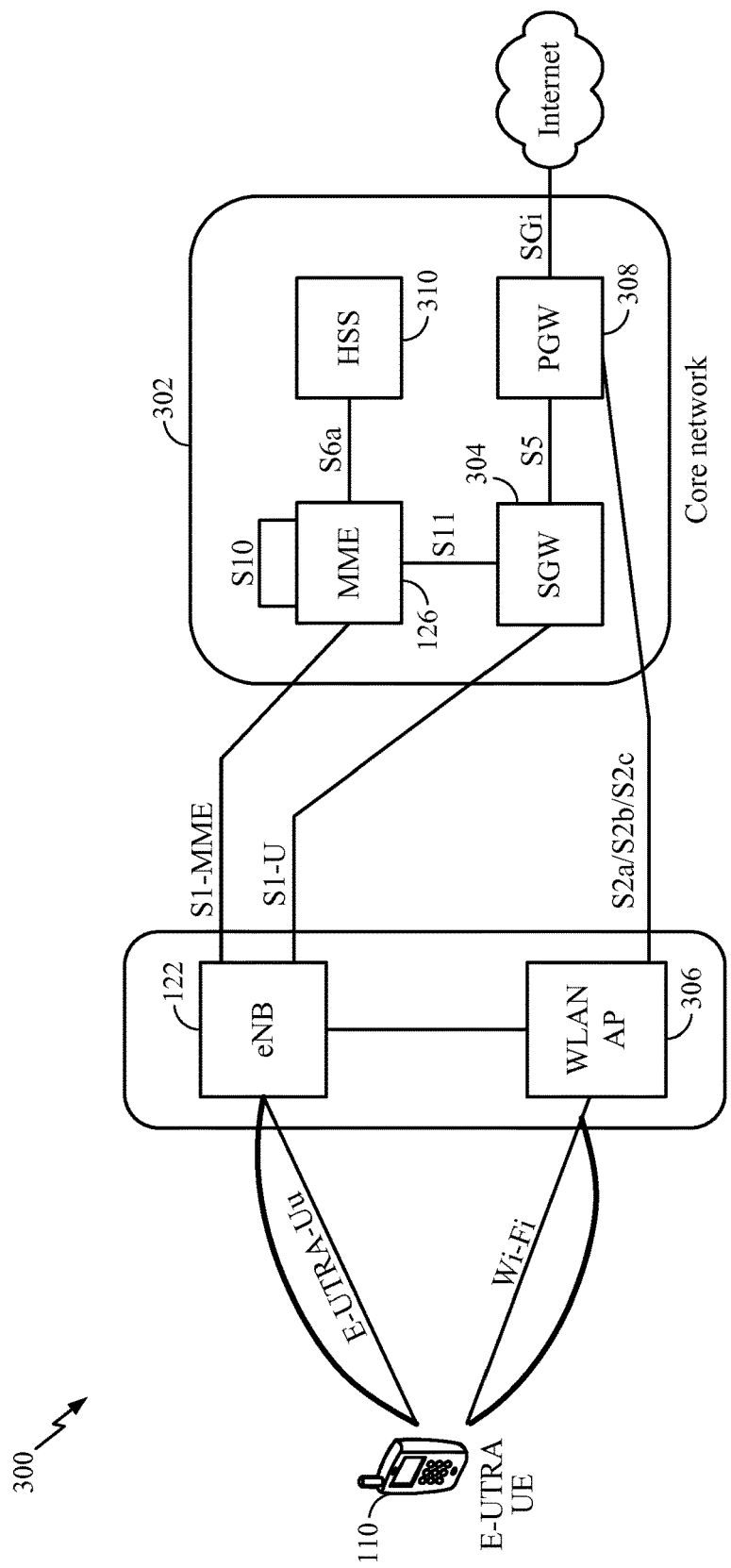
FIG. 3 illustrates an example architecture for wireless local area network (WLAN) to aggregation using separate EPS bearers terminating, according to certain aspects of the present disclosure.

Aggregation using separate Evolved Packet System (EPS) bearers that terminate at the radio access network (RAN). FIG. 3 illustrates an example architecture for WLAN to aggregation using separate EPS bearers terminating, according to certain aspects of the present disclosure. As seen in FIG. 3, a UE 110 may use separate EPS bearers at the core network (CN) 302, for example the eNB 122 and WLAN AP, i.e. the existing EPS bearers are uniquely mapped to be served by either the eNB 122 or the WLAN AP 306 serving the UE 110.

Figure 4:
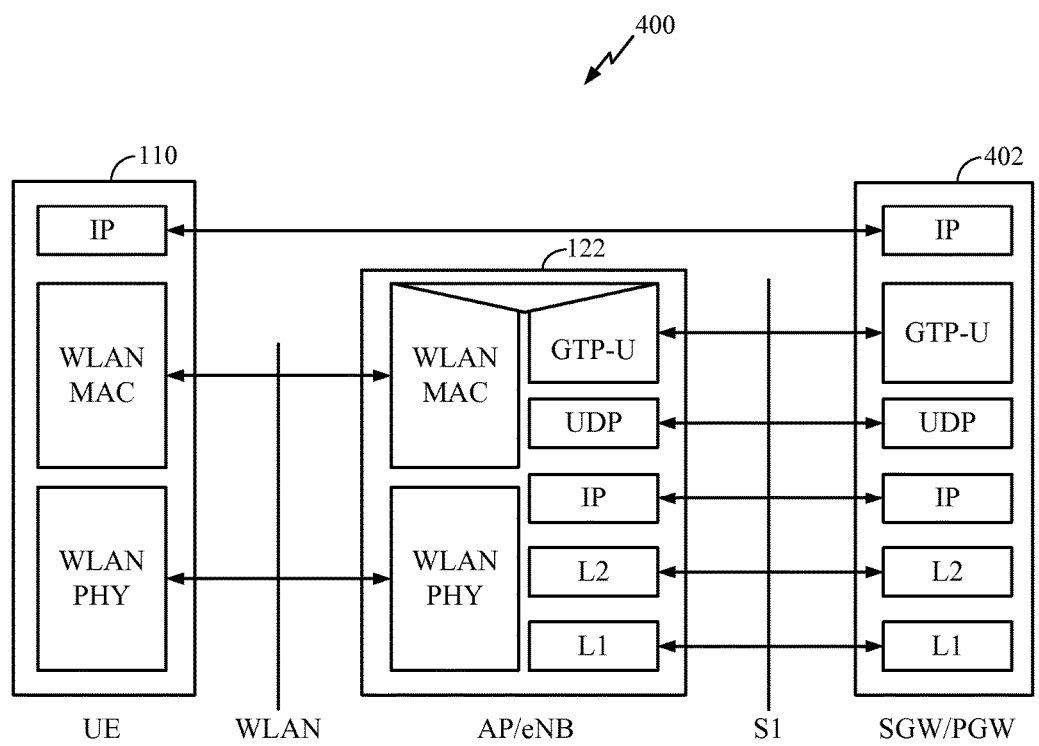
FIG. 4 illustrates an example user plane, according to certain aspects of the present disclosure.

FIG. 4 illustrates an example UE packet data network (PDN) gateway (UE-PGW) user plane. As seen in FIG. 4, the user plane between the UE 110 and PGW 308 for WLAN has aggregation using separate EPS bearers terminating at the RAN 130, for example, the UE 110 sends the bearers on the Wi-Fi AP. DL data is received at the Packet Data Network Gateway (PGW) 308 and separated into different EPS bearers and forwarded either to the eNB 122 or the AP 306.

For S2a-based Mobility over GTP (SaMOG), the UL data is received at the eNB 122 and the AP 306, forwarded to the PGW 402 in the appropriate EPS bearer, and S2a tunneled. For S1 bearer-based session continuity, the UL data received at the eNB 122 and AP 306 is forwarded to the SGW and PGW 402 in the appropriate EPS bearer (i.e., the AP 306 reuses the EPS bearer to forward the traffic).

Figure 5:
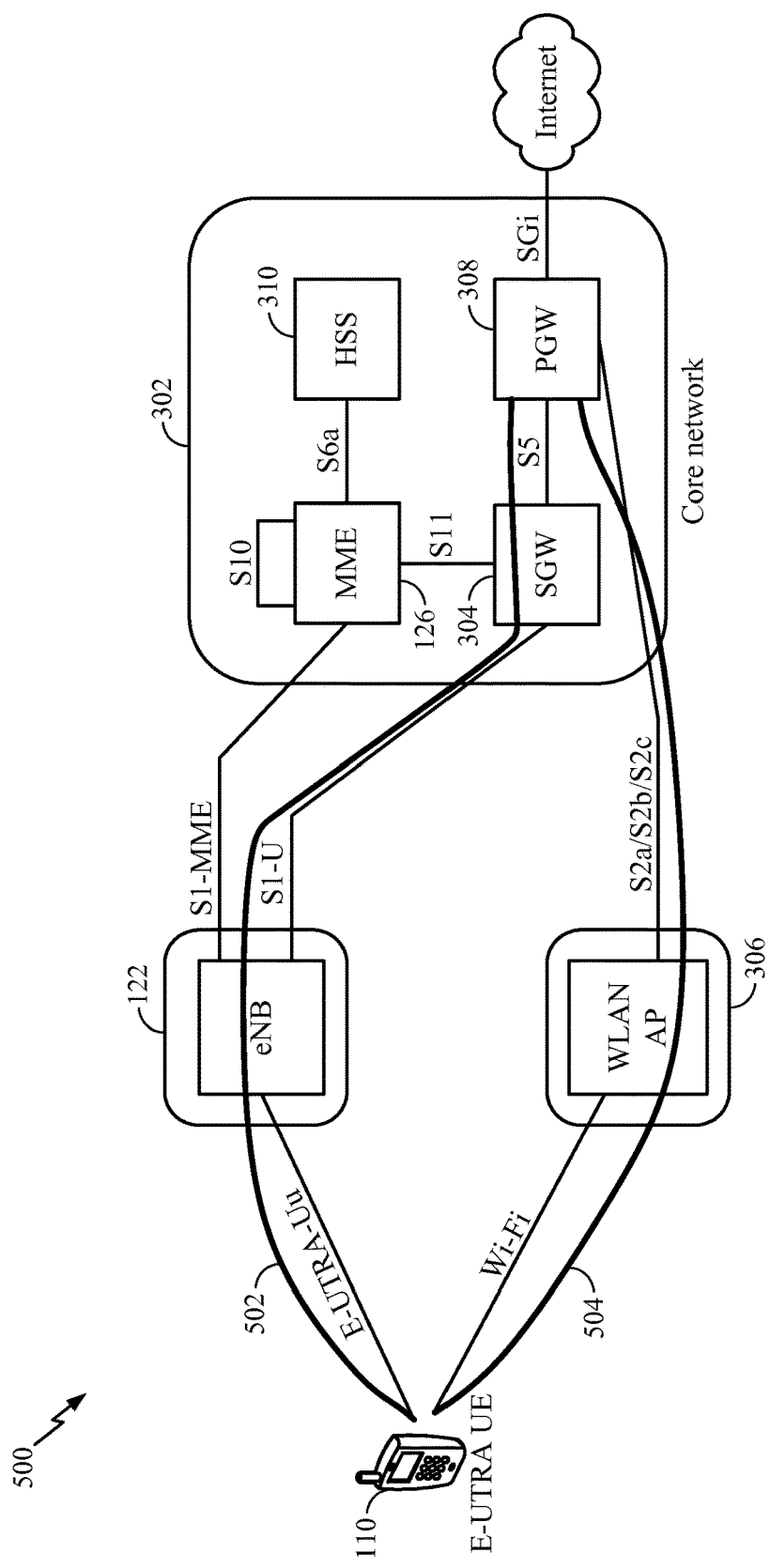
FIG. 5 illustrates example architecture for WLAN interworking using separate EPS bearers terminating at the CN, according to certain aspects of the present disclosure.

FIG. 5 illustrates an example architecture for WLAN interworking using separate EPS bearers terminating at the CN 302 defined by MAPCON, IFOM and SaMOG in Rel-9, Rel-10 and Rel-12, respectively. As seen in FIG. 5, the UE 110 sends the flows corresponding to some bearers via the 3GPP access (as indicated as flow 502) and other bearers via the Wi-Fi AP (as indicated as flow 504). For simplicity, the additional architectural elements of an ePDG between the AP and the PGW 308 for S2b are not shown.

Figure 6:
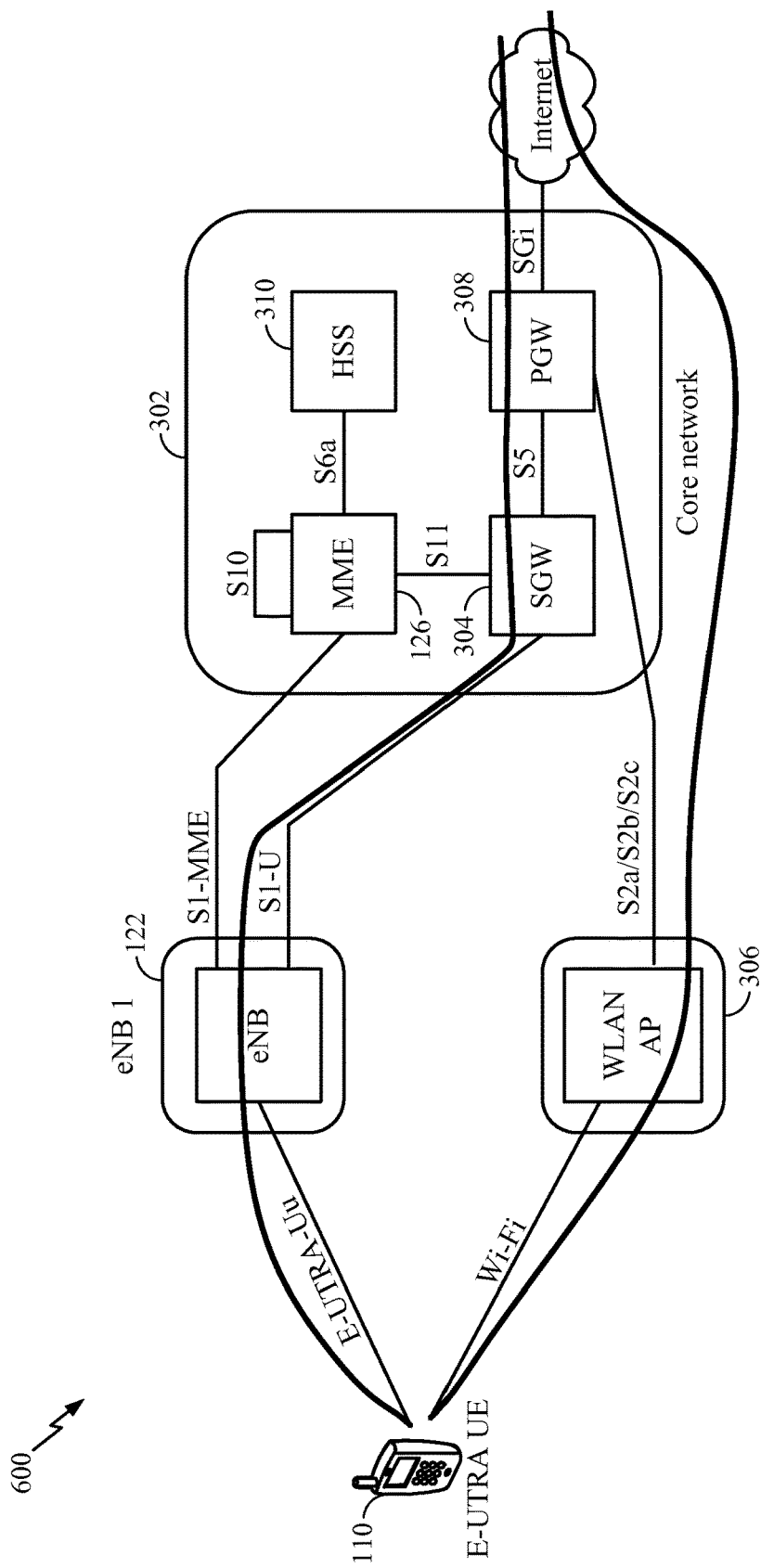
FIG. 6 illustrates an example reference architecture for non-seamless mobility using separate EPS bearers, according to certain aspects of the present disclosure.

FIG. 6 illustrates an example architecture for non-seamless mobility, according to certain aspects of the present disclosure. As seen in FIG. 6, the traffic sent via the eNB may use separate PDN connections and EPS bearers terminating at the CN 302 to go to the Internet, whereas the traffic sent via WLAN is sent directly to the internet. For example, the UE 110 may use a different IP address at the eNB 122 and at the Wi-Fi AP 306. Multipath TCP is an example of such aggregation.

According to certain aspects, the EPS bearer associated with an RLC packet in Long Term Evolution (LTE) is currently only in the Media Access Control (MAC) header in LTE. As such, for both bearer and packet aggregation in WLAN, the UE 110 and AP need to indicate the logical channel identifier (LC ID) for the EPS bearer in the WLAN MAC header if more than one bearer is sent in WLAN.

In some embodiments, such MAC headers may be EtherType. EtherType may be, for example, a 2 byte field in an Ethernet frame used to indicate which protocol is encapsulated in the Payload of an Ethernet Frame. The field within the Ethernet frame used to describe the EtherType also can be used to represent the size of the payload of the Ethernet Frame.

Figures 7, 8:
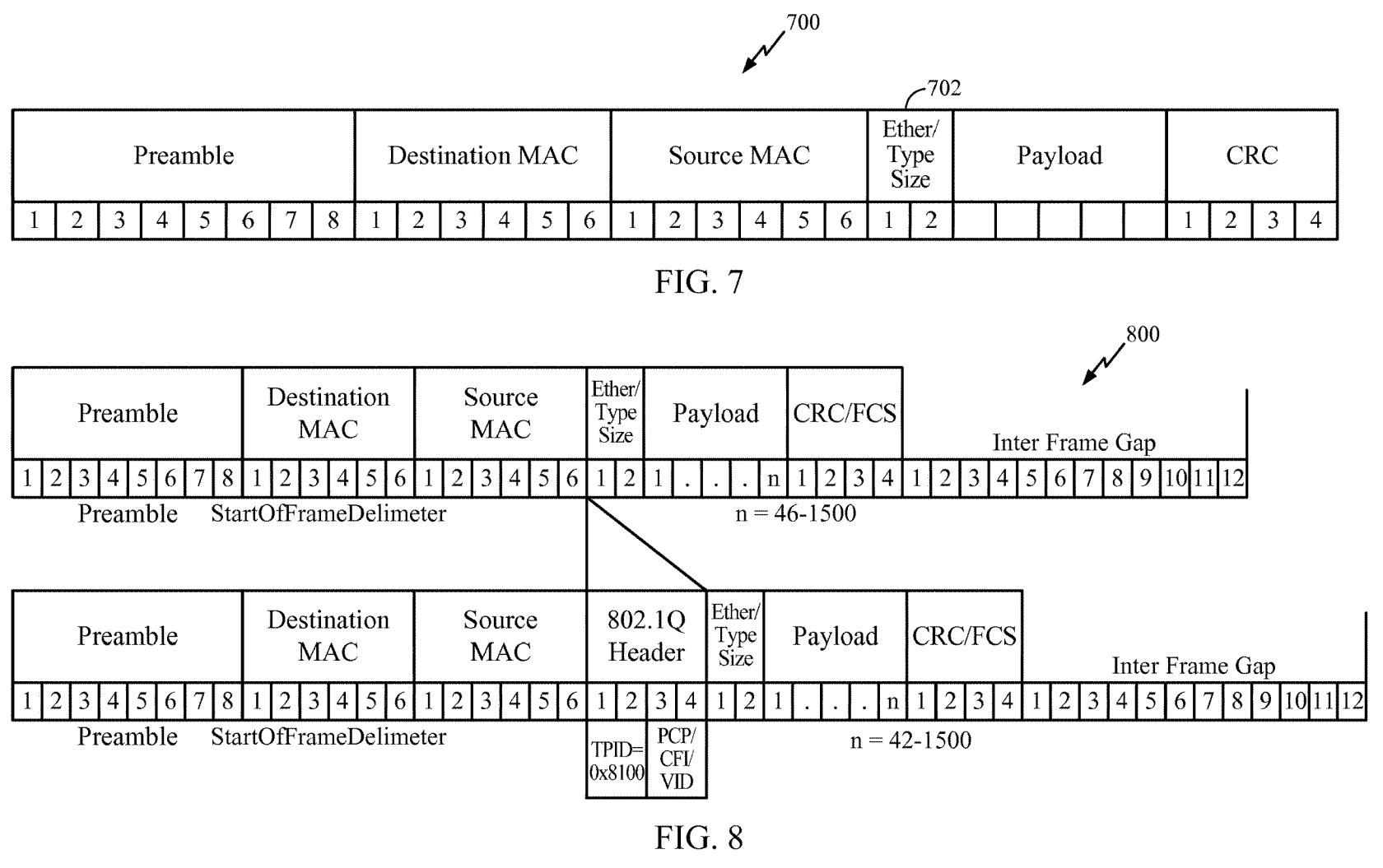

FIG. 7 illustrates an example Ethernet MAC frame 700 including the 2 byte EtherType 702 field. 802.11Q is a 4 byte field in an Ethernet frame. The 802.11Q header consists of the following fields: Tag Protocol Identifier (TPID) having 2 bytes set to a value of 0x8100 to identify the frame as an IEEE 802.1Q-tagged frame used to distinguish the frame from untagged frames; Tag Control Identifier (TCI) having 4 bits to indicate priority (0-7) and whether the packet may be dropped; and VLAN Identifier (VID) having a 12-bit field specifying the VLAN to which the frame belongs. FIG. 8 illustrates an example alternative Ethernet MAC frame 800 including the 802.11Q 4-byte header.

In certain scenarios, the UE 110 may need to know the identity of LTE/UMTS cells and WLAN APs where RAN 130 and WLAN interworking can occur (e.g., which combinations of LTE/UMTS cells and WLAN APs can be used for LTE and WLAN interworking). On the other hand, the network may need to know the corresponding identity of the UE 110 in each type of RAN access (e.g., to correlate the presence of a UE across the WLAN and the cellular access). For example, this may be used to distinguish among different UEs using RAN 130 and WLAN interworking as well as for each UE 110 in order to correctly route the traffic.

Aspects of the present disclosure provide techniques and various apparatus that may help correlate WLAN and WWAN identifiers to determine WLAN and WWAN interworking capability.

Figure 9:
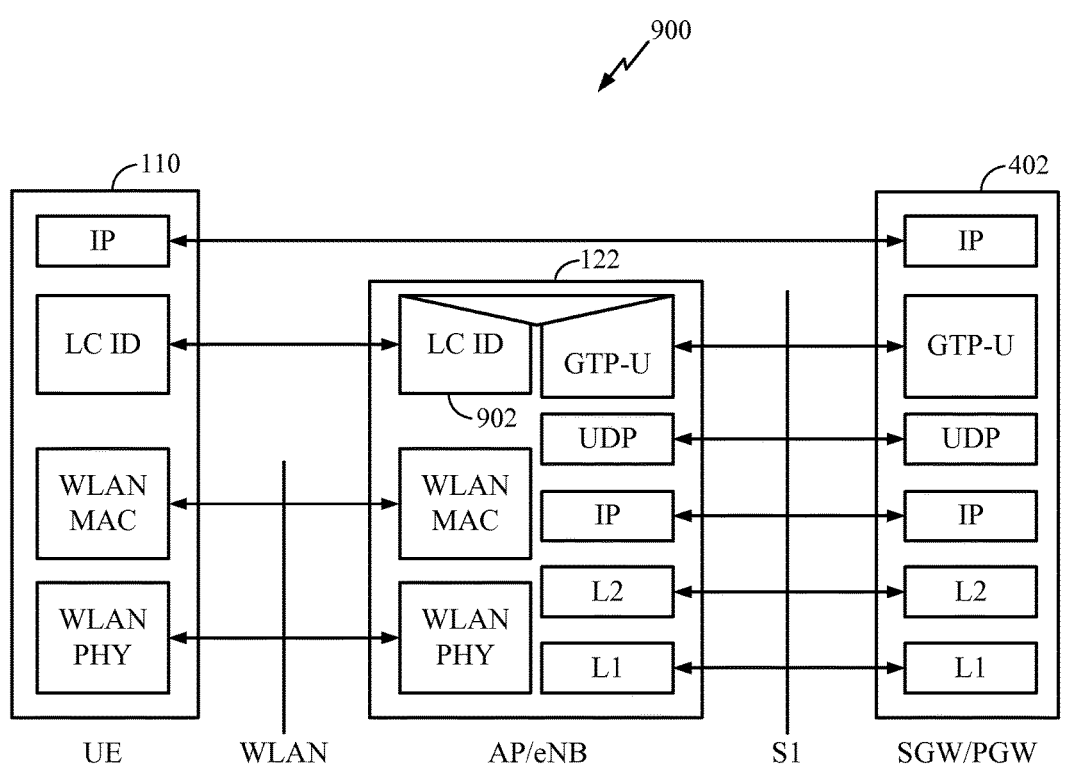
FIG. 9 illustrates an example user plane with WLAN, according to certain aspects of the present disclosure.

FIG. 9 illustrates an example architecture 900 of a UE-PGW user plane with WLAN, in accordance with certain aspects of the present disclosure. The UE-PGW user plane has aggregation using separate EPS bearers at the RAN 130 and an additional layer to identify the EPS bearers. In an alternative solution, an LC ID 902 in WLAN may be indicated by including an additional header sent over the WLAN to identify the EPS bearer as shown in FIG. 9. The LC ID 902 may be maintained at the AP/enB 122. For example, the UE 110 and AP/eNB 122 may include an additional header such as GRE to indicate the associated bearer.

As an example, an LC ID in WLAN may be indicated using an existing field in the WLAN MAC header as shown in FIG. 9. For example, the UE and AP may use the VLAN tag in the WLAN MAC header to indicate the associated bearer.

In some embodiments, the network may determine that the same UE 110 connects on WLAN and WWAN. A base station 132 may establish a communication with a UE 110 that is identified by a set of identifiers using a WWAN radio. The base station 132 may then establish a communication with a UE 110 that is identified by a different set of identifiers using a WLAN radio. The base station 132 may then determine that the UE 110 is the same UE 110, based on the two sets of identifiers.

In order to determine to whether RAN 130 and WLAN interworking is available there are two steps needed: initiating LTE/UMTS and WLAN interworking (e.g., determining at the network and UE 110 to start the RAN 130 and WLAN interworking), and determining how to distinguish between EPS bearers at WLAN in order to correctly identify the DL traffic at the UE 110 and place the UL traffic into the correct S1 bearer on the UL.

As noted previously, for initiating RAN 130 and WLAN interworking, the UE 110 may need to know the corresponding identity of LTE/UMTS cells and WLAN APs where the RAN 130 and WLAN interworking can occur (e.g., which combinations of LTE/UMTS cells and WLAN APs can be used for RAN and WLAN interworking. Similarly, the network needs to know the corresponding identity of the UE 110 in each access (e.g., to correlate the presence of a UE 110 across the WLAN and the cellular access). For example, this may be needed in order to be able to distinguish among different UEs using RAN 130 and WLAN interworking as well as for each UE 110 in order to correctly route the traffic.

The above exchange of capabilities and identities are needed since the identifiers for the UE 110 used in WLAN (such as IEEE 48 bit MAC ID) are different from the identifiers used by the UE 110 in, for example, LTE (e.g., Cell Radio Network Temporary Identifier/Identification (C-RNTI) or Global Unique Temporary Identifier/Identification (GUTI)). Therefore, the UE 110 may need to either send the eNB 122 the WLAN MAC address or equivalent to be used or send the WLAN AP 306 the C-RNTI or GUTI or equivalent to be used.

In some embodiments, the association may be network initiated. The UE 110 may indicate to the network that the UE 110 supports RAN 130 and WLAN interworking as a capability. The network then indicates to the UE 110 to access either the LTE/UMTS or WLAN access, including a cell or AP identifier of the corresponding access, to initiate the RAN 130 and WLAN interworking procedures. The UE 110 capability may be indicated by signaling as part of the access in radio resource control (RRC), via non access stratum (NAS), via higher layer signaling or as part of the UE 110 subscription information. Higher layer signalling may use UDP or TCP transport protocols over the Internet Protocol. Alternatively, the UE 110 identity and capability may be signalled in WLAN, for example, using a vendor specific extension in the association procedure.

In some embodiments, indication that the UE 110 supports LTE and WLAN interworking capability may be provided as part of establishing communication. Alternatively, the indication that the UE 110 supports LTE and WLAN interworking capability may be provided as a part of a registration with the WWAN network, for example, in the Attach or Tracking Area Update (TAU) procedures.

The network indication may occur, via signaling such as radio resource control (RRC), for example, when the connection is established, or in WLAN, for example, as part of vendor specific signalling or IP layer signalling. As a part of the network indication, the RRC or WLAN signalling may indicate the WLAN BSSID, or RAN cell ID respectively to the UE, i.e., the RAN 130 or WLAN access indicates to the UE 110 the identity of the corresponding AP or (e)NB at which the RAN 130 and WLAN interworking procedures apply. Alternatively, various other types of identifiers may be used for WLAN.

For LTE, the eNB cell ID, tracking area, PCI, CSG ID, or some other identifier may be used to determine the corresponding LTE cell associated with the WLAN interworking. For UMTS, the NB cell ID, routing area, PSC, CSG ID or some other identifier can be used to determine the corresponding UMTS cell associated with the WLAN interworking.

In some embodiments, the association may be UE initiated. The network may advertise, for example, in a system information block (SIB) or RRC (e.g., LTE/UMTS) or Probe Response (e.g., WLAN) that RAN 130 and WLAN interworking is supported. When the UE 110 accesses either on RAN 130 or WLAN, the UE 110 may request to use the RAN 130 and WLAN interworking procedures.

The network advertisement may include a capability or an identifier of the corresponding WLAN BSSID(s), or cell ID(s) where the RAN 130 and WLAN interworking is supported. Alternatively, one of the other identifiers for the RAN 130 and WLAN as described above may be used.

The UE request may be indicated as part of the LTE access in RRC, via NAS, via higher layer signaling, or as part of the WLAN association procedures.

Determining the corresponding identity of the UE in each access may be UE provided or network provided. In some embodiments, when the UE requests access in RRC, via NAS, or as part of the WLAN association procedures, the UE request may include an identifier of the UE in the corresponding access. For example, the UE request in WLAN may indicate the CRNTI being currently used in LTE or the GUTI of the UE. Similarly, the UE request in LTE/UMTS may indicate the network access identifier (NAI) or the IEEE 48-bit MAC address of the UE used in WLAN. In either case, security procedures such as integrity protection may be used to confirm the UE's identity matches in the other access, e.g., through the use of the EAPOL signalling in WLAN as part of the association procedure.

In some embodiments, when the network indicates to the UE to access WLAN, the network may provide the WLAN AP with the UE identifier that will be used, and/or shared, over the backhaul connection. For example, if the network knows the MAC ID of the UE or some other credential that will be provided to WLAN as part of the access procedures, the identity can be passed to WLAN or, conversely, so the AP 306 and eNB 122 can map the UE accessing the WLAN to the corresponding UE in LTE/UMTS or the UE in LTE/UMTS to the UE in WLAN. Alternatively, the WLAN may provide the UE with a CRNTI to use as part of a handover procedure to LTE similar to how CRNTI is provided today between the source and target cells in a LTE handover.

The mapping between the LC ID included in WLAN to the corresponding LC ID in EPS may be determined using dynamic or fixed mapping. For dynamic mapping, the corresponding LC ID WLAN to EPS bearer mapping may be negotiated either when the UE connects to WLAN, or in the RRC command sent by the eNB 122 to go to WLAN 306. For fixed mapping, a fixed mapping may use the same LC ID in WLAN as EPS.

In some embodiments, the network may instruct the UE to establish communications in response to receiving the indication the UE supports LTE and WLAN interworking. In some embodiments, the indication may be an identifier identifying where to establish the communication, i.e., in WLAN or WWAN.

In some embodiments, indication that the network supports LTE and WLAN interworking may be provided, for example, in RRC, SIB or probe response, a WLAN carrier setup request message, or an association response. In some embodiments, a request to establish LTE and WLAN interworking may be sent as part establishing a communication with a WLAN or WWAN.

Figure 10:
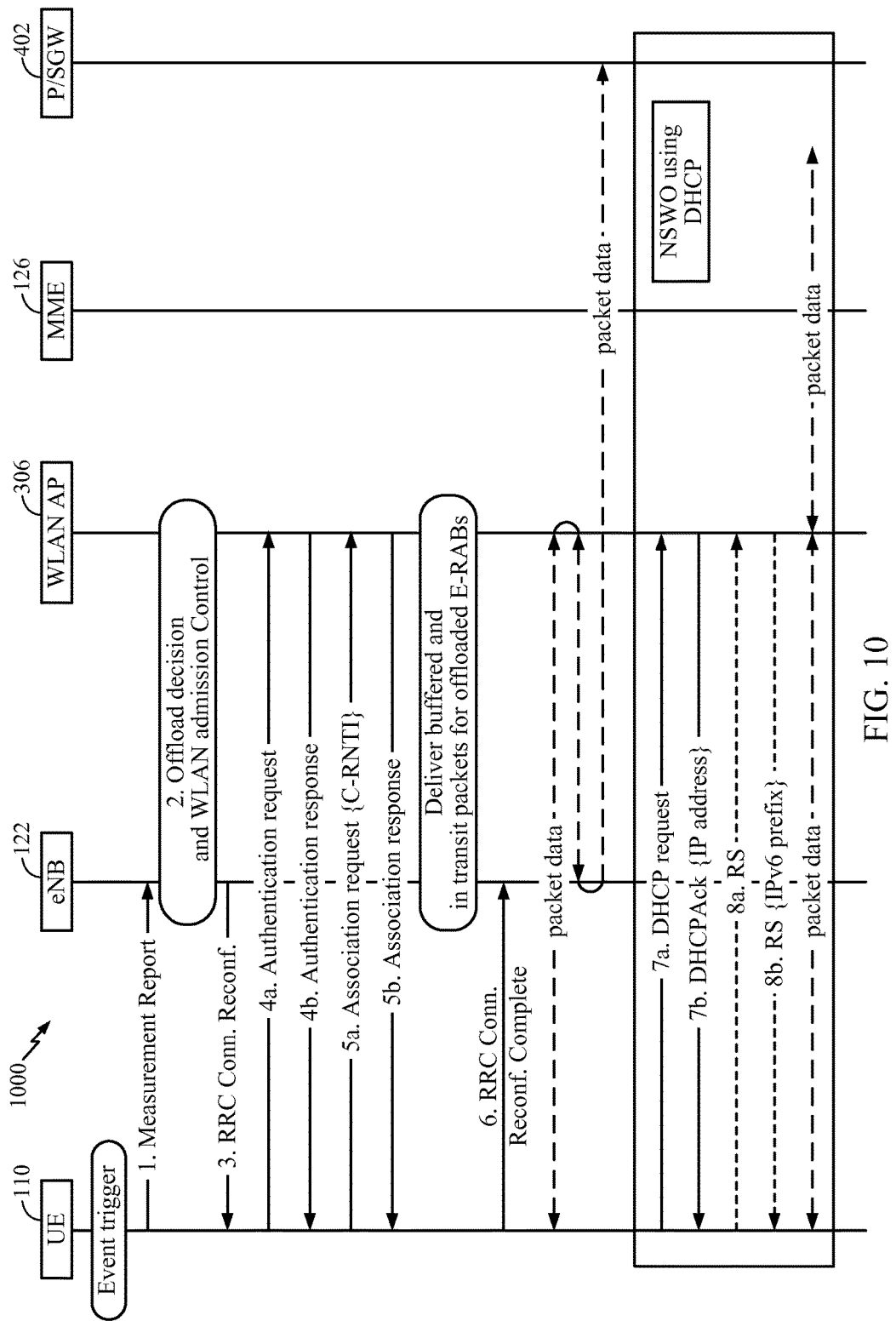
FIG. 10 illustrates an example eNB to WLAN AP association procedure over radio resource control (RRC), according to certain aspects of the present disclosure.

FIG. 10 illustrates an example call flow 1000 for an associate procedure for an eNB 122 to WLAN AP 306 over RRC, according to certain aspects of the present disclosure, with a numbered sequence of steps.

As illustrated, in some embodiments the UE 110 sends the Measurement report message (step 1) using RRC over the RAN 130. Based on the measurement report the eNB 122 may determine to initiate the LTE and WLAN 306 interworking procedures. Alternatively, there are any number of triggers that may be used to initiate the LTE and WLAN interworking procedures, such as the UE sending the authentication request in step 4 or UE reporting WLAN quality via WLAN measurements, such as IEEE 802.11k.

The eNB 122 may send an RRCConnectionReconfiguration message (step 3) to the UE. In one embodiment, the message includes a list of DRBs to be offloaded (step 2). The list of DRBs may include a corresponding identifier to be used by the UE on WLAN for the DRB. For example, if the UE uses a VLAN ID or GRE tunnel to send the bearer traffic, then the list of DRBs may include a corresponding a VLAN ID or GRE key for each offloaded bearer.

In step 4, the UE may perform authentication with the WLAN AP. It may be noted that the additional authentication procedures after step 5 are not shown, but any of various supported WLAN security mechanisms may be reused.

In step 5, after successful authentication, the UE may associate with the WLAN AP. As part of the association procedures, the UE may include the corresponding identity of the UE in LTE. Similarly, the association procedures may include a negotiation on the corresponding identifiers of the EPS bearers that are being sent over WLAN, e.g., a mapping of the LC ID to the corresponding identifier used in WLAN such as a VLAN ID or GRE key corresponding to each LC ID.

In step 6, the UE sends a RRCConnectionReconfigurationComplete message to the eNB 122 to indicate that the association was successful.

In step 7a, for non-seamless WLAN Offload (NSWO), the UE sends a DHCPv4 request as per IETF RFC 2131 [11], or DHCPv6 request as per IETF RFC 3315 [12] to the WLAN AP to receive an IP address. In step 7b, the WLAN AP responds with a DHCPAck including the IP address to use at the local network. The UE may report a WLAN MAC address and an LTE IP address. The network may assign the same IP configuration to the WLAN interface, as recognized via matching the WLAN MAC address.

In step 8a, for IPv6, the UE performs router discover by sending a Router Solicitation message. And in step 8b, the WLAN AP replies with a Router Solicitation message. The UE may then send data using the NSWO IP address.

In some embodiments, WLAN APs may be identified as target identifier, i.e. corresponding to a specific WLAN AP, or a group of WLAN APs, and target frequency, i.e., corresponding to a specific WLAN channel or a WLAN band. Target identifiers may be, but are not limited to: BSSID, to search for a specific WLAN AP, e.g., in the case of a collocated WLAN AP 306 and eNB 122 (it may be noted that BSSID is used to identify an individual AP, whereas the other measurement targets are used to identify an ESS); SSID, to search for a specific SSID which may represent a WLAN service provider (SP); HESSID, to search for a specific Hotspot SP included in the Interworking IE (802.11u) as part of the beacon or Probe Response (it may be noted that HESSID is more controlled than SSID based search but assumes Hotspot support at the WLAN; and 3GPP Cellular Network Info, to search for a specific PLMN (802.11u). Target frequencies may be, but are not limited to, Operating class and Channel number.

Figure 11:
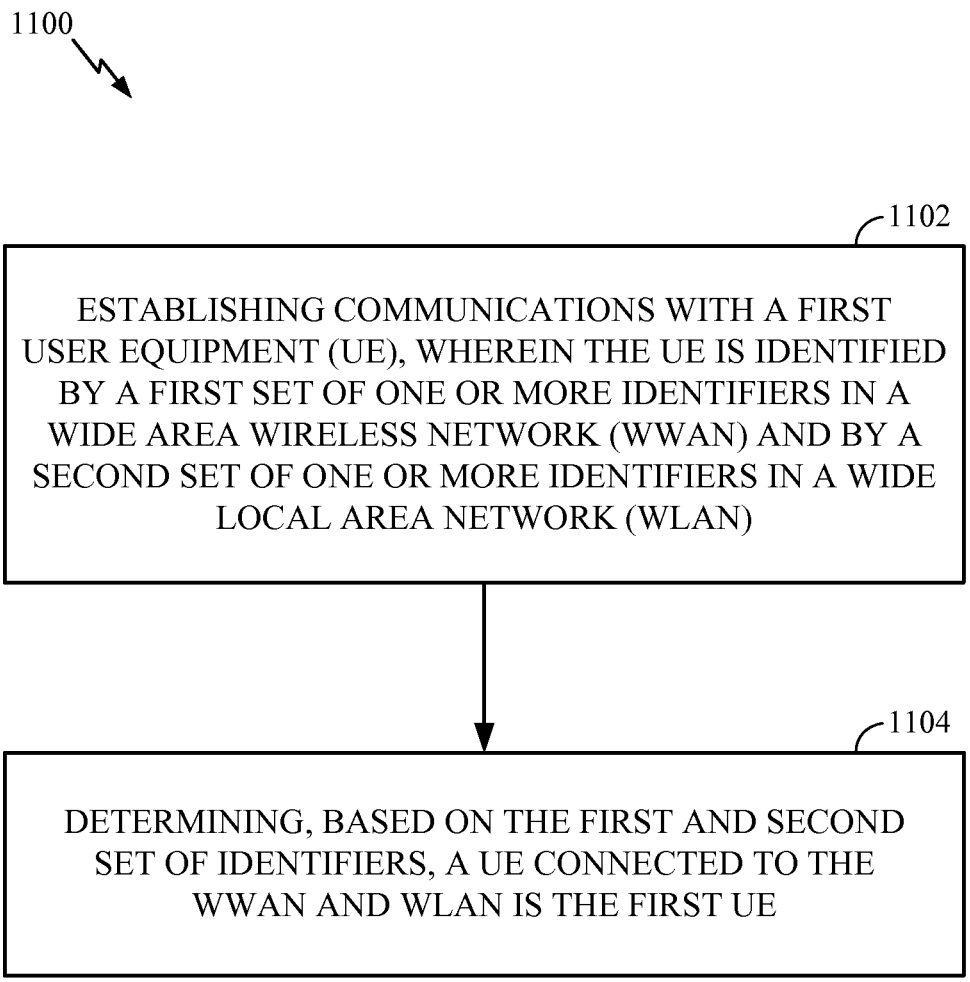
FIG. 11 illustrates example operations for secure wireless communications by a base station (BS), according to certain aspects of the present disclosure.

FIG. 11 illustrates example operations 1100 for confirming identity of a UE registered at both a WLAN and WWAN, according to certain aspects of the present disclosure. The operations may be performed, for example, by a base station (BS) 132 of either network (e.g., a WLAN AP 306 or an LTE eNB 122).

At 1102, the base station 132 establishes communications with a first UE, wherein the UE is identified by a first set of one or more identifiers in a wide area wireless network (WWAN) and by a second set of one or more identifiers in a wide local area network (WLAN). At 1104, the base station 132 determines, based on the first and second set of identifiers, a UE connected to the WWAN and WLAN is the first UE.

Figure 12:
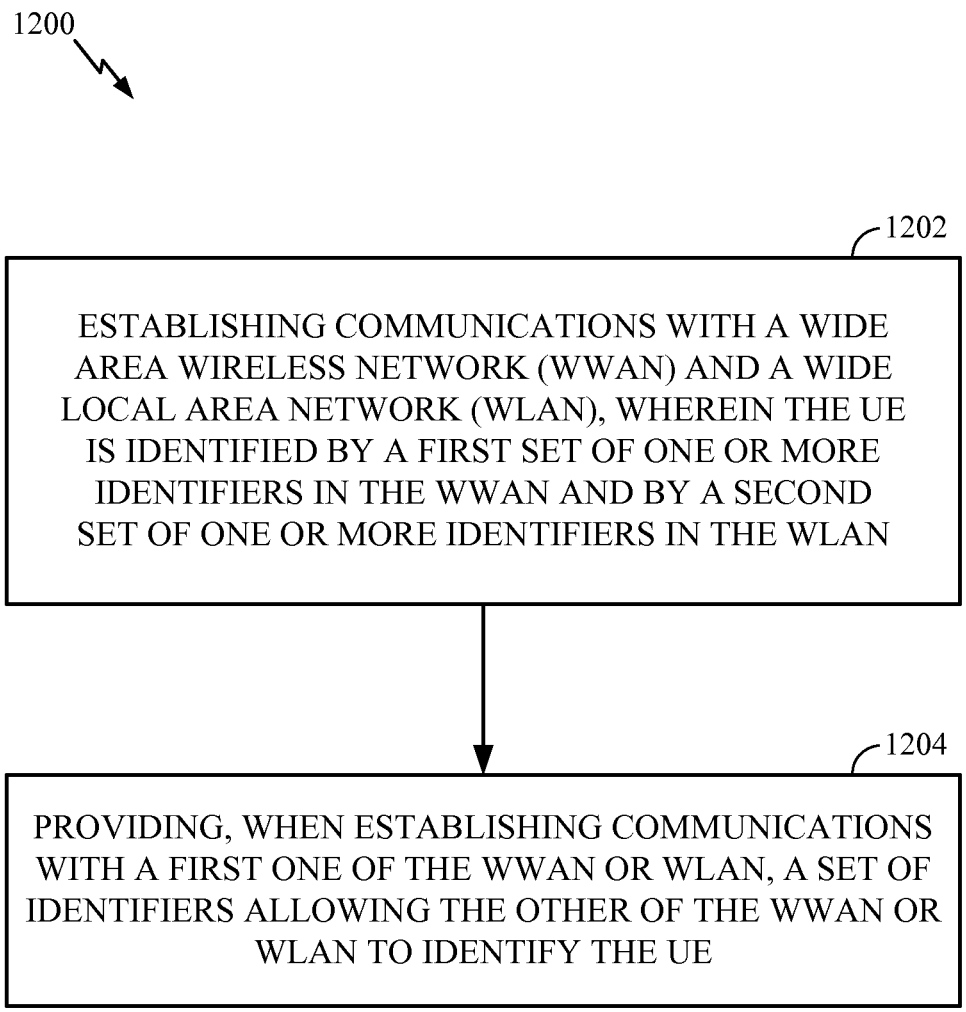
FIG. 12 illustrates example operations for secure wireless communications by a UE, according to certain aspects of the present disclosure.

FIG. 12 illustrates example operations 1200 for secure wireless communications, according to certain aspects of the present disclosure. The operations may be performed, for example, by a UE. The operations 1200 begin, at 1202, by establishing communications with a wide area wireless network (WWAN) and a wide local area network (WLAN), wherein the UE is identified by a first set of one or more identifiers in the WWAN and by a second set of one or more identifiers in the WLAN. At 1204, the UE provides, when establishing communications with a first one of the WWAN or WLAN, a set of identifiers allowing the other of the WWAN or WLAN to identify the UE.

As discussed above, while establishing association with the UE, the eNB 122 may determine that WWAN and WLAN interworking capability is supported, which may be at the RAN 130 or at the CN 302. In some embodiments, the determination may be provided during registration with the WWAN. In some embodiments, the eNB 122 may send the UE an indication directing the UE to associate with a WWAN and WLAN, if the eNB 122 determines that WLAN and WWAN interworking is supported as a capability. In some embodiments, the indication may be sent via RRC signaling, SIB, probe response, or an association response. RRC WLAN interworking connection setup procedure may enable the eNB 122 to determine corresponding the WLAN MAC ID of the UE and the types of interworking supported by the UE.

In some embodiments, the UE may provide its WLAN MAC address as part of the UE capabilities procedures to configure the LTE UE and WLAN STA mapping on the eNB 122. As part of the capabilities, the UE may also indicate the UE's support of the different types of WLAN and LTE interworking such as at the CN 302 or in the RAN 130.

Figure 13:
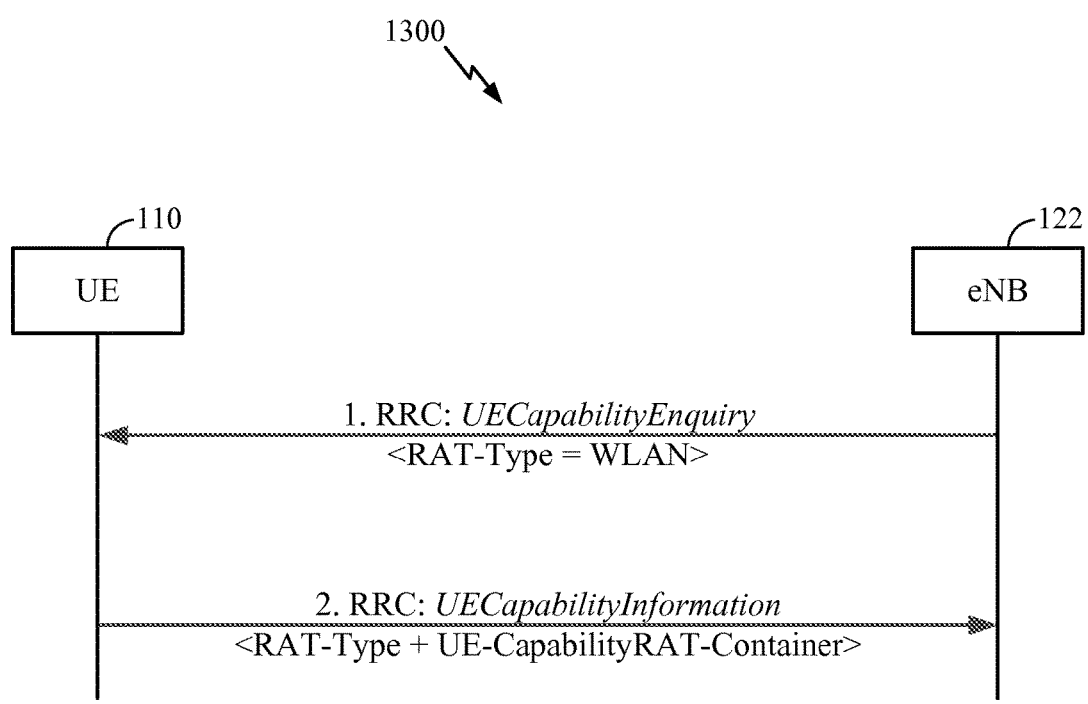
FIG. 13 illustrates example call flow for eNB initiated RRC UE capability handling procedures, according to certain aspects of the present disclosure.

FIG. 13 illustrates example call flow 1300 for eNB 122 initiated radio resource control (RRC) UE capability handling procedures, according to certain aspects of the present disclosure. FIG. 13 shows RRC procedures for enabling LTE and WLAN RAN interworking.

As seen in FIG. 13, the eNB 122 may forward a RRC: UECapabilityEnquiry message to the UE. In some embodiments, the UECapabilityEnquiry message may indicate a request to include WLAN capabilities as an additional RAT-type. In response to receiving the UECapabilityEnquiry message, the UE may respond with a UECapabilityInformation message. In the example embodiments, the UECapabilityInformation message may include the UE radio access capabilities for WLAN within a UECapabilityRATContainer with the RAT-type set to WLAN.

According to certain standards (e.g., in TS 36.300), the MME 126 stores the UE Radio Capabilities that are forwarded by the eNB 122 in the S1-AP: UE Capability Information Indication message. For example, the eNB 122 may acquire the UE capabilities after a handover completion. When the UE establishes a connection, the MME 126 may include the last received UE capabilities as part of the S1-AP: Initial Context Setup Request message sent to the eNB 122. During handover preparation, the source RAN node may transfer the UE source RAT capabilities and the target RAT capabilities to the target RAN node, in order to minimize interruptions. In TS 36.300, possible RAT-types include EUTRAN, UTRAN, GERAN-PS, GERAN-CS, CDMA2000-1XRTT.

In one proposed changed, RAT-type information element may be updated to include WLAN capabilities. The WLAN RAT-type information element may be used to convey UE WLAN Radio Access Capability Parameters to the network. In some embodiments, the UE-WLAN-Capability field description for CN-interworking may be set to "supported" if the UE supports a CN LTE and WLAN interworking. The field description for RAN-interworking may be set to "supported" if the UE supports a RAN LTE and WLAN interworking.

Several aspects of a telecommunications system have been presented herein with reference to a WLAN and LTE system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for secure wireless communications by a first base station, comprising:
   establishing communications with a first user equipment (UE), wherein the first UE is identified by a first set of one or more identifiers in a wide area wireless network (WWAN) and by a second set of one or more identifiers in a wide local area network (WLAN), wherein the establishing comprises providing the first UE with an indication of one of the first or second set of one or more identifiers;

receiving an indication of the other one of the first or second set of one or more identifiers; and determining, based on the first set of one or more identifiers and the second set of one or more identifiers, that a UE connected to the WWAN and WLAN is the first UE.

2. The method of claim 1, further comprising receiving, from the first UE, a long term evolution (LTE) Internet Protocol (IP) address and a WLAN media access control (MAC) address.

3. The method of claim 2, further comprising assigning the first UE a same IP configuration for the WLAN as for the WWAN, based on a detected match of the WLAN MAC address.

4. The method of claim 1, wherein:
the first set of one or more identifiers comprises at least one of a cell radio network temporary identification (C-RNTI) or global unique temporary identification (GUTI); and
the second set of one or more identifiers comprises at least one of a network access identifier (NAI) or a media access control (MAC) address.

5. The method of claim 1, wherein the determining comprises:
comparing an identifier from the first set of one or more identifiers to an identifier from the second set of one or more identifiers.

6. The method of claim 1, wherein the receiving comprises:
receiving an indication of the first set of identifiers from the first UE as part of establishing communications with the WWAN.

7. The method of claim 1, wherein the receiving comprises:
receiving an indication of the second set of one or more identifiers from the first UE as part of establishing communications with the WLAN.

8. The method of claim 1, wherein the receiving comprises:
receiving the indication over a backhaul connection between the first base station in WWAN or the WLAN and a second base station in the other one of the WWAN or WLAN.

9. The method of claim 1, wherein the first set of one or more identifiers for the WWAN comprises at least one identifier from the second set of one or more identifiers for the WLAN.

10. The method of claim 9, wherein the first set of one or more identifiers comprises one of the second set of one or more identifiers provided by the first UE via one or more of radio resource control (RRC) or non access stratum (NAS) signaling.

11. The method of claim 1, further comprising determining the first UE supports WWAN and WLAN interworking as a capability.

12. The method of claim 11 further comprising receiving another indication that the UE supports WWAN and WLAN interworking as a capability as a part of the establishing, wherein the determination that the UE supports WWAN and WLAN interworking as a capability is based on the other indication.

13. The method of claim 11, further comprising receiving another indication that the first UE supports WWAN and WLAN interworking as a capability as a part of a registration procedure with the UE, wherein the first base station is in the WWAN, wherein the determination that the UE supports WWAN and WLAN interworking as a capability is based on the other indication.

14. The method of claim 11, wherein the WLAN and WWAN interworking comprises WWAN and WLAN interworking at at least one of a radio access network (RAN) or a core network (CN).

15. The method of claim 11, further comprising directing the first UE, via one of the WWAN or WLAN, to establish communication with the other one of the WWAN or WLAN, in response to the determination.

16. The method of claim 15, wherein the directing comprises providing, to the first UE, an identifier of where to establish the communication.

17. The method of claim 1, further comprising indicating, to the first UE, that the WWAN and WLAN networks support WWAN and WLAN interworking as a capability.

18. The method of claim 17, wherein the indication is provided via at least one of radio resource control (RRC) signaling, a system information block (SIB), a probe response, or an association response.

19. The method of claim 17, further comprising indicating, to the first UE, to establish WWAN and WLAN interworking as part of the establishing communication with the WWAN or WLAN.

20. A method for secure wireless communications by a user equipment (UE), comprising:
establishing communications with a first base station in one of a wide area wireless network (WWAN) or a wide local area network (WLAN), wherein the UE is identified by a first set of one or more identifiers in the WWAN and by a second set of one or more identifiers in the WLAN, wherein the establishing comprises receiving an indication from the first base station of the first or second set of one or more identifiers that identify the UE in the WWAN or WLAN; and
establishing communications with a second base station in the other one of the WWAN or WLAN, wherein the establishing communications with the second base station comprises providing an indication to the second base station of the indicated first or second set of one or more identifiers allowing the second base station to identify the UE.

21. The method of claim 20, wherein:
the first set of one or more identifiers comprises at least one of a cell radio network temporary identification (C-RNTI) or global unique temporary identification (GUTI); and
the second set of one or more identifiers comprises at least one of a network access identifier (NAI) or a media access control (MAC) address.

22. The method of claim 20, wherein the providing the indication comprises:
providing an indication of a long term evolution (LTE) Internet Protocol (IP) address or a WLAN media access control (MAC) address.

23. The method of claim 22, further comprising receiving a same IP configuration for the WLAN as for the WWAN.

24. The method of claim 20, wherein:
the indicated first or second set of one or more identifiers is provided as part of establishing communications with the second base station in the WWAN.

25. The method of claim 20, wherein:
the indicated first or second set of one or more identifiers is provided as part of establishing communications with the second base station in the WLAN.

26. The method of claim 20, wherein the first set of one or more identifiers for the WWAN comprises at least one identifier from the second set of one or more identifiers for the WLAN.

27. The method of claim 26, wherein the first set of one or more identifiers comprises one of the second set of one or more identifiers provided by the UE via radio resource control (RRC) signaling.

28. The method of claim 22, further comprising providing an indication to at least one of the first base station or the second base station that the UE supports WWAN and WLAN interworking as a capability.

29. The method of claim 28, wherein the indication is provided as a part of the establishing communication with WLAN.

30. The method of claim 28, wherein the indication is provided as a part of a registration with the WWAN.

31. The method of claim 28, wherein the WLAN and WWAN interworking comprises WWAN and WLAN interworking at at least one of a radio access network (RAN) or a core network (CN).

32. The method of claim 28, further comprising being directed, via one of the WWAN or WLAN, to establish communication with the other one of the WWAN or WLAN, in response to the indication.

33. The method of claim 32, wherein the direction comprises receiving an identifier of the first base station or the second base station.

34. The method of claim 32, wherein the direction is provided as part of the establishing communication with the WWAN or WLAN.

35. The method of claim 28, further comprising receiving an indication that the WWAN and WLAN networks support WWAN and WLAN interworking as a capability.

36. The method of claim 35, wherein the indication is provided via at least one of radio resource control (RRC) signaling, a system information block (SIB), a probe response, or an association response.

37. An apparatus for secure wireless communications by a first base station, comprising:
    means for establishing communications with a first user equipment (UE), wherein the first UE is identified by a first set of one or more identifiers in a wide area wireless network (WWAN) and by a second set of one or more identifiers in a wide local area network (WLAN), wherein the establishing comprises providing the first UE with an indication of one of the first or second set of one or more identifiers;
    means for receiving an indication of the other one of the first or second set of one or more identifiers; and
    means for determining, based on the first set of one or more identifiers and the second set of one or more identifiers, that a UE connected to the WWAN and WLAN is the first UE.

38. The apparatus of claim 37, further comprising means for receiving, from the first UE, a long term evolution (LTE) Internet Protocol (IP) address and a WLAN media access control (MAC) address.

39. The apparatus of claim 38, further comprising means for assigning the first UE a same IP configuration for the WLAN as for the WWAN, based on a detected match of the WLAN MAC address.

40. The apparatus of claim 37, wherein:
    the first set of one or more identifiers comprises at least one of a cell radio network temporary identification (C-RNTI) or global unique temporary identification (GUTI); and
    the second set of one or more identifiers comprises at least one of a network access identifier (NAI) or a media access control (MAC) address.

41. The apparatus of claim 37, wherein the means for determining comprises means for comparing an identifier from the first set of one or more identifiers to an identifier from the second set of one or more identifiers.

42. The apparatus of claim 37, further comprising means for determining the first UE supports WWAN and WLAN interworking as a capability.

43. The apparatus of claim 42, further comprising means for directing the first UE, via one of the WWAN or WLAN, to establish communication with the other one of the WWAN or WLAN, in response to the determination.

44. An apparatus for secure wireless communications by a first base station, comprising:
    at least one processor configured to:
        establish communications with a first user equipment (UE), wherein the first UE is identified by a first set of one or more identifiers in a wide area wireless network (WWAN) and by a second set of one or more identifiers in a wide local area network (WLAN), wherein the establishing comprises providing the first UE with an indication of one of the first or second set of one or more identifiers;
        receive an indication of the other one of the first or second set of one or more identifiers; and
        determine, based on the first set of one or more identifiers and the second set of one or more identifiers, that a UE connected to the WWAN and WLAN is the first UE; and
    a memory coupled to the at least one processor.

45. A non-transitory computer readable medium having instructions stored thereon, the instructions executable by one or more processors for:
    establishing communications with a first user equipment (UE), wherein the first UE is identified by a first set of one or more identifiers in a wide area wireless network (WWAN) and by a second set of one or more identifiers in a wide local area network (WLAN), wherein the establishing comprises providing the first UE with an indication of one of the first or second set of one or more identifiers;
    receiving an indication of the other one of the first or second set of one or more identifiers; and
    determining, based on the first set of one or more identifiers and the second set of one or more identifiers, that a UE connected to the WWAN and WLAN is the first UE.

46. An apparatus for secure wireless communications by a user equipment (UE), comprising:
    means for establishing communications with a first base station in one of a wide area wireless network (WWAN) or a wide local area network (WLAN), wherein the UE is identified by a first set of one or more identifiers in the WWAN and by a second set of one or more identifiers in the WLAN, wherein the establishing comprises receiving an indication from the first base station of the first or second set of one or more identifiers that identify the UE in the WWAN or WLAN; and
    means for establishing communications with a second base station in the other one of the WWAN or WLAN, wherein the establishing communications with the second base station comprises providing an indication to the second base station of the indicated first or second set of one or more identifiers allowing the second base station to identify the UE.

47. The apparatus of claim 46, wherein:

the first set of one or more identifiers comprises at least one of a cell radio network temporary identification (C-RNTI) or global unique temporary identification (GUTI); and the second set of one or more identifiers comprises at least one of a network access identifier (NAI) or a media access control (MAC) address.

48. The apparatus of claim 46, wherein the means for providing the indication comprises:

means for providing an indication of a long term evolution (LTE) Internet Protocol (IP) address or a WLAN media access control (MAC) address.

49. The apparatus of claim 48, further comprising means for receiving a same IP configuration for the WLAN as for the WWAN.

50. The apparatus of claim 48, further comprising means for providing an indication to at least one of the first base station or the second base station that the UE supports WWAN and WLAN interworking as a capability.

51. The apparatus of claim 50, further comprising means for being directed, via one of the WWAN or WLAN, to establish communication with the other one of the WWAN or WLAN, in response to the indication.

52. An apparatus for secure wireless communications by a user equipment (UE), comprising:

at least one processor configured to:

establish communications with a first base station in one of a wide area wireless network (WWAN) or a wide local area network (WLAN), wherein the UE is identified by a first set of one or more identifiers in the WWAN and by a second set of one or more identifiers in the WLAN, wherein the establishing comprises receiving an indication from the first base station of the first or second set of one or more identifiers that identify the UE in the WWAN or WLAN; and establish communications with a second base station in the other one of the WWAN or WLAN, wherein the establishing communications with the second base station comprises providing an indication to the second base station of the indicated first or second set of one or more identifiers allowing the second base station to identify the UE; and a memory coupled to the at least one processor.

53. A non-transitory computer readable medium having instructions stored thereon, the instructions executable by one or more processors for:

establishing communications with a first base station in one of a wide area wireless network (WWAN) or a wide local area network (WLAN), wherein the UE is identified by a first set of one or more identifiers in the WWAN and by a second set of one or more identifiers in the WLAN, wherein the establishing comprises receiving an indication from the first base station of the first or second set of one or more identifiers that identify the UE in the WWAN or WLAN; and establishing communications with a second base station in the other one of the WWAN or WLAN, wherein the establishing communications with the second base station comprises providing an indication to the second base station of the indicated first or second set of one or more identifiers allowing the second base station to identify the UE.

* * * * *